April 25, 1944.   S. H. BENJAMIN   2,347,237
SAFETY BLADE MAGAZINE HOLDER
Filed June 3, 1941   3 Sheets-Sheet 1

INVENTOR.
Sidney H. Benjamin
BY Howard Freeman
his ATTORNEY

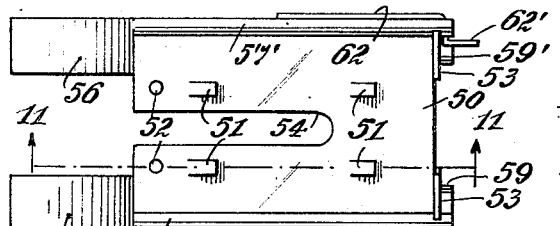
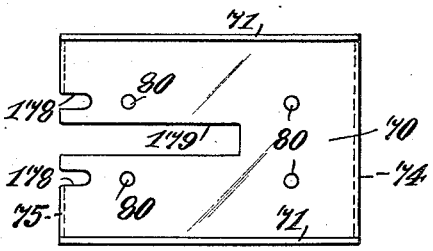
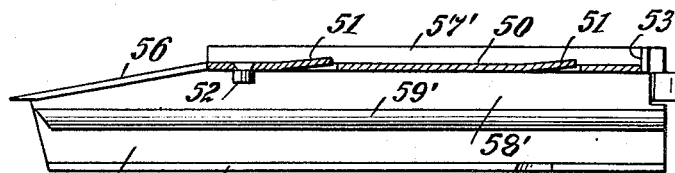
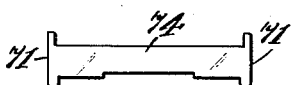
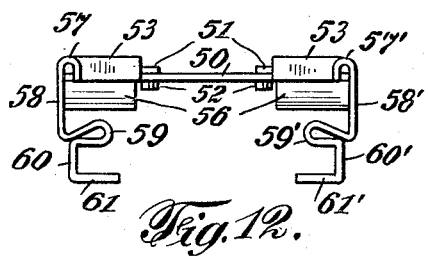
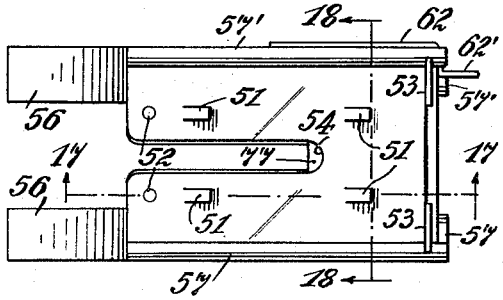
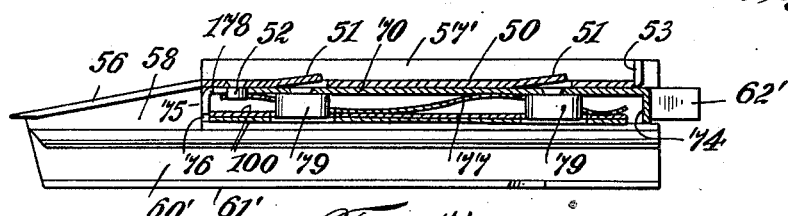
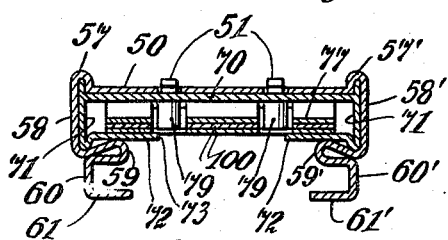
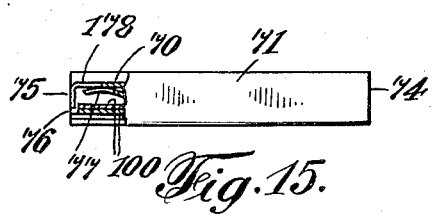

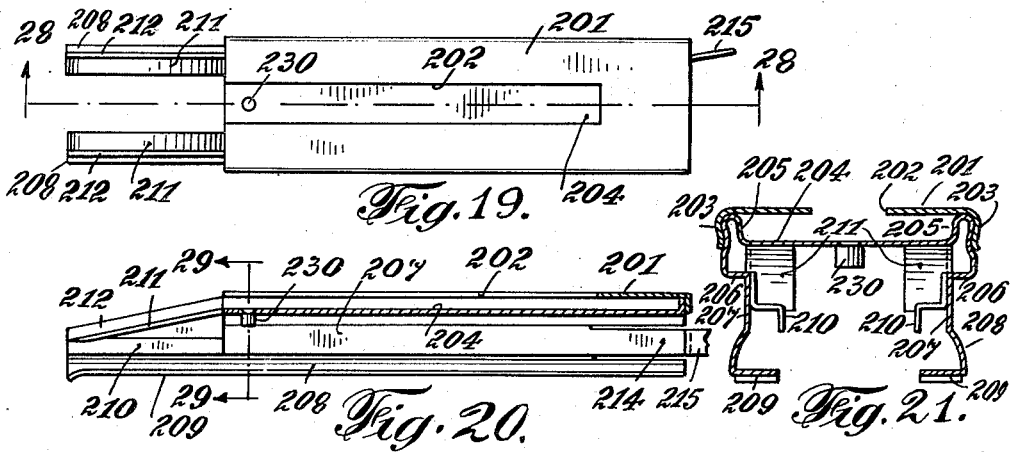
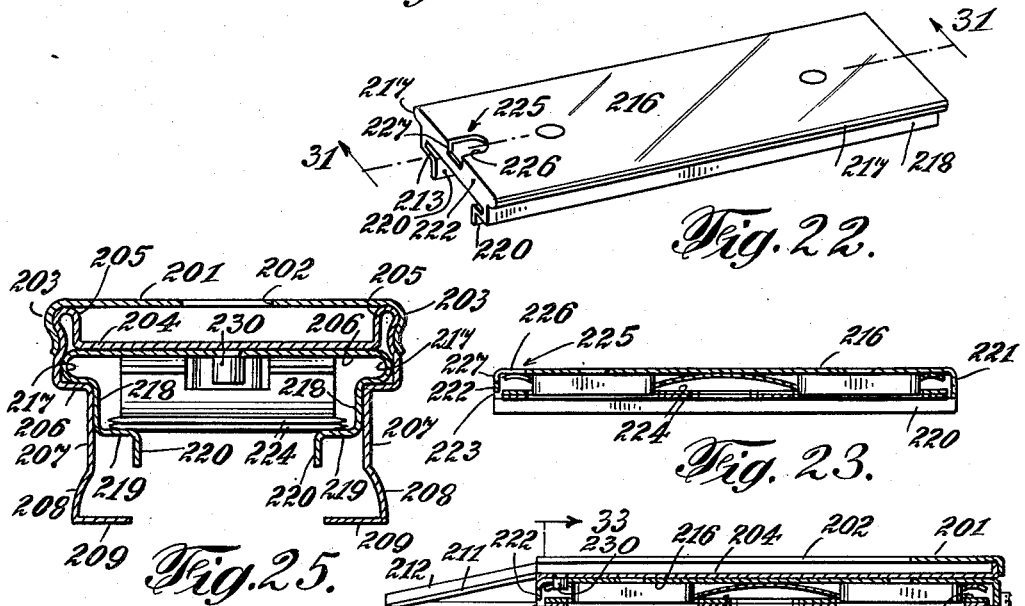
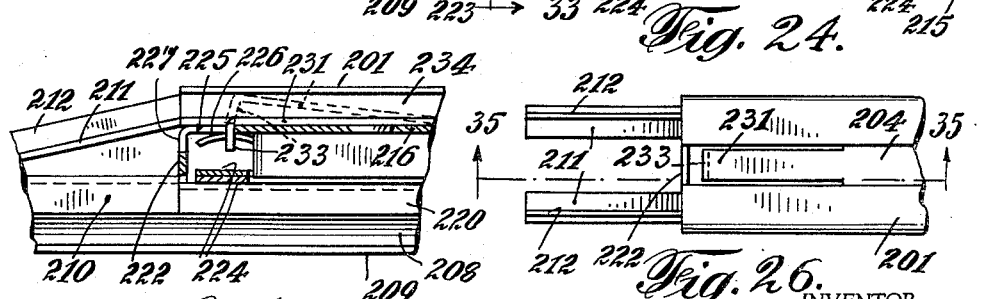

Patented Apr. 25, 1944

2,347,237

UNITED STATES PATENT OFFICE 2,347,237

SAFETY BLADE MAGAZINE HOLDER

Sidney H. Benjamin, Milwaukee, Wis.

Application June 3, 1941, Serial No. 396,385

4 Claims. (Cl. 30—40)

My invention relates to blade magazine holders and refers particularly to blade magazine holders adapted to receive and removably retain blade magazines.

The blade magazine holders of my invention are particularly adapted for the reception and removable retention of blade magazines carrying a plurality of stacked razor blades, said blade magazines being so constructed as to allow the ejection, or otherwise removal, of only the outermost blade of said stacked blades, the other blades being retained therein. The safety blade magazine holders described in this application are particularly adapted for use with the blade magazines described in my pending United States patent application, Serial Number 398,053, filed June 14, 1941.

The object of the devices of my invention is to allow of the removal of the uppermost blade in a stack of blades within a blade magazine and to place said removed blade in a desired position upon an element of a razor head, said device may be, if desired, so constructed as to remove a positioned blade from an element of a razor head.

As the blade magazine must be in a predetermined position within the blade magazine holder in order that the ejecting means may operate to withdraw, or eject, a blade therefrom, it is evident that some means must be employed to so position the blade magazine with respect to the withdrawing, or ejecting, means that the latter may properly operate.

One of the objects of my invention, therefore, is a blade magazine holder having means adapted to allow of the proper positioning of a blade magazine having a recess in its forward end portion, while preventing the proper positioning of a blade magazine not having a recess in its forward end portion, said blade magazine holder being of such further construction as to allow the introduction of a removed, or ejected, blade of a blade magazine to be positioned upon an element of a razor head, and to remove a blade from an element of a razor head if desired.

The novelty and utility of the devices of my invention will be evident upon a consideration of my specification and its accompanying drawings.

In the accompanying drawings illustrating modified forms of the devices of my invention, similar parts are designated by similar numerals.

Figure 10 is a top plan view of a modified form of a blade magazine holder of my invention.

Figure 11 is an enlarged section through the line 11—11 of Figure 10.

Figure 12 is a right hand elevation of Figure 10.

Figure 13 is a top plan view of a blade magazine adapted for use with the magazine holder shown in Figures 10, 11, and 12.

Figure 14 is a right hand end view of Figure 13.

Figure 15 is a side view of the blade magazine shown in Figures 13 and 14, partly broken away Figure 16 is a top plan view of the combined magazine holder shown in Figures 10, 11 and 12 and blade magazine shown in Figures 13, 14 and 15.

Figure 17 is an enlarged section through the line 17—17 of Figure 16.

Figure 18 is a section through the line 18—18 of Figure 16.

Figure 19 is a top plan view of a modified form of a device of my invention.

Figure 20 is an enlarged section through the line 28—28 of Figure 19.

Figure 21 is a section through the line 29—29 of Figure 20.

Figure 22 is a perspective view of a blade magazine adapted to operate with the described holder.

Figure 23 is a section through the line 31—31 of Figure 22.

Figure 24 is a central longitudinal section of the combined described blade magazine shown in Figures 22 and 23 within the described blade magazine holder shown in Figures 19, 20 and 21.

Figure 25 is a section through the line 33—33 of Figure 24.

Figure 26 is a partial top plan view of a modified form of my device.

Figure 27 is a section through the line 35—35 of Figure 26.

Figure 1:
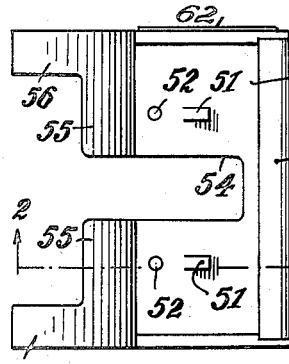
Figure 1 is a top plan view of one form of a blade magazine holder.
Figure 2:
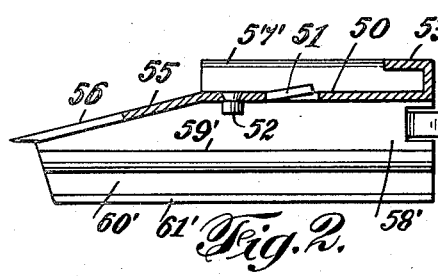
Figure 2 is a section taken through the line 2—2 of Figure 1.
Figure 3:
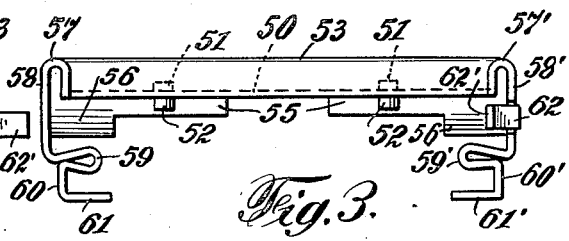
Figure 3 is a rear end view of Figure 1.

The particular form of the device of my invention shown in Figures 1, 2 and 3, adapted for razors of the Gem type, comprises the top member 50 having the two upwardly extended cut-out blade engaging members 51, 51, and the inwardly extended stop pins 52, 52. These stops 52, 52, are so positioned that a blade magazine must extend inwardly beyond them, in order that the blade ejecting means may be operative. The rearward end portion of the top member 50 is extended upwardly forming the U-shaped member 53, and the forward end portion of the top member 50 has a recess 54 and is inclined downwardly, forming a blade guide comprised of the two members 55, 55 and 56, 56, the forward end portions of the members 56, 56 being bevelled. The sides of the device are formed by the U-shaped members 57, 57', which is extended downwardly to form the members 58, 58', then inwardly forming the loop members 59, 59', thence downwardly forming the members 60, 60' and thence inwardly forming the two spaced bottom members 61, 61'. The number and position of stop pins 52, 52 and the number and positions of cut-outs 51, 51 may be varied if desired. The two spaced bottom members 61, 61' may be extended toward each other forming a unitary bottom, in which case the forward portion of the bottom member will have an inwardly directed recess. One of the side members has a Z-shaped resilient retaining member 62, the central portion of which is normally positioned within the side member, thus forming a blocking member therein, this blocking member being capable of removal from its normal position by means of its outwardly extended member 62'.

Magazine holders of the character described are adapted to receive a removable blade magazine containing a plurality of stacked blades and to co-operate with razor heads to withdraw a previously deposited blade and to deposit an unused blade and position it thereon for shaving purposes.

In order to withdraw a used blade it is necessary that some means be employed whereby the used blade may be removably attached to the magazine holder or to the blade magazine while the devices are in contact with the razor head and that the attaching means be of such contruction as to remove the used blade from the razor head.

My invention is directed to blade magazine holders in which such withdrawing means are a part of the magazine holder and hence, can be employed with blade magazines having no such withdrawing means.

In order to show the novelty and usefulness of the blade magazine holders of my invention, I illustrate modified forms of blade magazines adaptable for use therewith.

Figure 4:
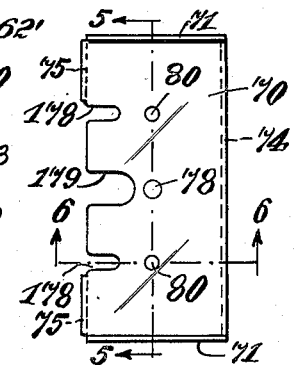
Figure 4 is a top plan view of one form of a blade magazine adapted for use with the device of Figures 1, 2 and 3.
Figure 7:
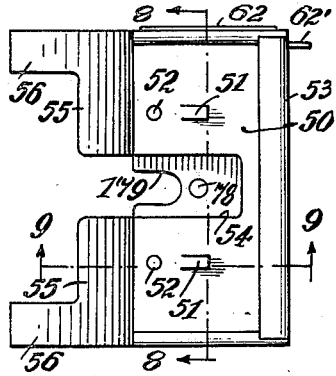
Figure 7 is a top plan view of the magazine holder with the blade magazine inserted therein.
Figure 5:
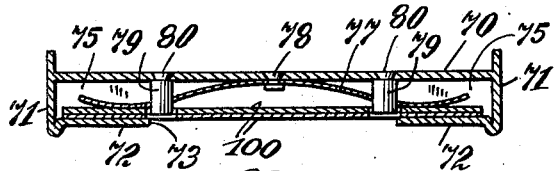
Figure 5 is a section through the line 5—5 of Figure 4.
Figure 6:
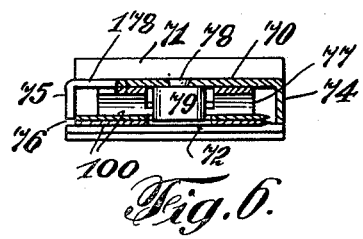
Figure 6 is a section through the line 6—6 of Figure 4.
Figure 8:
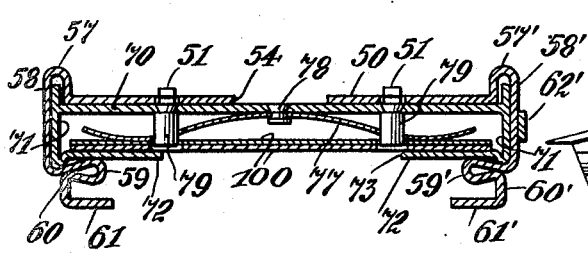
Figure 8 is a section through the line 8—8 of Figure 7.

The particular form of a blade magazine adapted for use with the previously described blade magazine holder shown in Figures 4, 5 and 6 comprises a top member 70, the two side members 71, 71, the two spaced bottom members 72, 72 forming the longitudinal opening, or recess, 73, and the end members 74 and 75, the end member 75 being extended downwardly to form the opening 76, through which the bottom blade 100 may be withdrawn, or ejected, while the remaining blades 100, 100 are retained within the magazine.

A plurality of blades 100, 100 are positioned within the magazine and are pressed downwardly by the spring 77, fastened to the top member 70 by means of the rivet 78. The top member 70 carries the two downwardly extended lugs 79, 79, fastened thereto by rivets 80, 80 and adapted to pass through an opening, or openings, in the razor blades 100, 100 and through openings in the spring 77. The top has forwardly positioned recesses 178, 178 and 179, the recess being adapted to receive a lug of a razor head.

It is evident that a blade magazine without the recesses 178, 178 cannot be operatively employed with the described magazine holder, as the stops 52, 52 will prevent its being inserted far enough to properly position it for blade removal.

Figure 9:
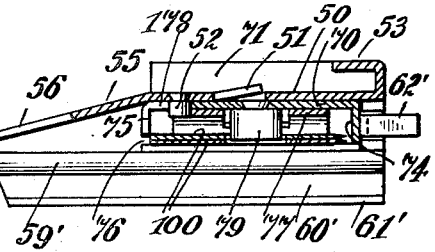
Figure 9 is a section through the line 9—9 of Figure 7.

In operation, the blade magazine is introduced into the holder through its rearward end and moved forwardly therein until the inner ends of the recesses 178, 178 of the magazine abut upon the stops 52, 52 of the magazine, the blades then being in position for withdrawal, or ejection, from the magazine for placement upon a razor head for shaving purposes. When the magazine is in this operative position, the inner portion of the Z-shaped retaining member 62 is in the position shown specifically in Figure 9, thus preventing the outward movement of the magazine.

To operate the thus combined magazine holder and blade magazine, the two outward extended arms 56, 56 of the blade guiding members 55, 55 are introduced between the guard of a razor head and a blade positioned thereon and moved inwardly, during which movement the positioned blade is removed from lugs positioning it on the guard and moves upwardly over the upper face of the blade guides 55, 55 and then across the upper face of the top 50 of the magazine holder, this movement continuing until the blade engaging members 51, 51 of the magazine holder enter openings in the blade. When the blade is in this position upon the magazine holder, the magazine holder and its blade magazine are withdrawn from contact with the razor head, thus withdrawing the formerly positioned blade from the razor head.

The device of my invention shown in Figures 10 to 18, inclusive, is adapted for use with the Gillette type of razors and is similar to that previously shown and described; similar parts being designated by similar numerals. This form of my device, however, varies slightly from that previously described in order to adapt it for the particular construction of the Gillette type of razor and blades, such variations, however, do not affect the co-ordination between the magazine holder and a blade magazine, nor do they affect the operation of these two assembled elements for the withdrawal of a positioned blade from a razor head, and, hence, a detailed description is not necessary for a clear understanding of their construction and application. It will be noted that the magazine holder of this construction has four blade engaging members 51, 51, instead of two as shown in the previously described device.

The modified form of my device shown in Figures 19, 20, and 21, which refers particularly to narrow razor blades, comprises the top member 201, having the longitudinal slot 202 and having the downwardly extended sides 203, 203. The above-described device acts as a cover for the magazine holder proper.

The magazine holder proper comprises the top member 204 carrying the downwardly extended stop member 230. Each side of the top member 204 is extended upwardly and then downwardly to form the loop member 205 which is then extended inwardly forming the member 206, then downwardly forming the member 207, then downwardly forming the curved member 208, then inwardly forming the member 209. Fixedly attached to the forward end of the inner face of each member 207 is a Z-shaped member having the downwardly extended member 210. The forward end member of the top 204 is inclined downwardly forming the two blade guide members 211, 211, each of which carries an upwardly extended flange member 212. One side member 207 carries a Z-shaped resilient retaining member 214, the central portion of which is normally within the magazine holder, but can be removed therefrom by movement of the extended member 215.

In order to illustrate the use of the above-described magazine holder, Figures 30 and 31 illustrate a blade magazine capable of being used with the above-described magazine holder. This blade magazine comprises the top member 216. Each side of the top member 216 is bent to form a loop member 217, thence, downwardly forming the member 218, thence, inwardly forming the member 219, and then downwardly forming the member 220. The blade magazine has the closed end 221 and the end 222, which is spaced from the side members 219, 219, forming an opening 223, the height of which is great enough to allow of the passage therethrough of the bottom member of a stack of razor blades 224, 224 therethrough, but preventing the passage therethrough of other blades of this stack of blades.

The forward end of the top member 216 has a cut-out 225, forming the opening 226 in the top member 216 and the opening 227 in the front end member 222.

Figures 24 and 25 show the described blade magazine inserted within the described magazine holder, from which it will be noted that unless the blade magazine has an opening in its forward end of such construction as to allow the passage of the stop member 230 therethrough, the blade magazine cannot be inserted into the magazine holder to allow the operation of the blade ejecting means.

In the modified form of a magazine holder and blade magazine shown in Figures 26 and 27, the stop member 230 of the previously described magazine holder is replaced by a struck-out tongue 231 cut-out of the top member 204 and bent downwardly at its forward end forming a stop member 233.

It will be noted that in this form of magazine holder, a blade magazine having a cut-out, such as 225, in its forward end will allow of the complete introduction of a blade holder for blade ejection, but if a blade magazine not having such forward cut-out is introduced into the magazine holder, the forward end of the blade magazine will abut upon the stop member 233, preventing its being introduced far enough to allow the blade ejecting means to operate. It will be further noted that if such a blade magazine is forcibly introduced beyond the stop member 233, it will force the stop member 233 to assume the position shown in broken lines, thus blocking the chamber 234 between the top member 201 and the top member 204, preventing the movement of a deposited blade into this chamber, and hence, the complete insertion of the magazine holder into the razor head. As the complete insertion of the magazine holder into the razor head is necessary for the deposition of a new blade, the device cannot be successfully employed.

It will be noted that in this form of my device, as in the previously described devices, the magazine holder carries a stop member, so positioned that it is necessary for the blade magazine to have a recess in its forward portion in order to allow the placement of the magazine in a position to allow the operation of a blade ejector.

By "blade magazine" I mean a magazine containing a plurality of stacked razor blades, so constructed as to allow of the ejection of a single blade at one time.

By "operative position" and similar words I mean that the blade magazine is so positioned within the magazine holder as to allow of the ejection of a single blade therefrom by the ejection means employed with the magazine holder.

While I have shown and described the preferred form of my invention, it is obvious that modifications may be made in the structure disclosed without departing from the spirit of the invention defined in the following claims.

What I claim is:

1. A razor blade magazine holder adapted to have a blade magazine introduced into and removably retained therein comprising a top member, a bottom member and two side members, said top member and said bottom member having centrally positioned aligned recesses in their forward portions, and at least one interiorly extended stop pin carried by said top member, said stop pin, or pins, being positioned forwardly of the inner extremity of said recesses.

2. A razor blade magazine holder adapted to have a blade magazine introduced into and removably retained therein comprising a top member extending downwardly, a bottom member and two side members, said top member and said bottom member having centrally positioned aligned recesses in their forward portions, and at least one interiorly extended stop pin carried by said top member, said stop pin, or pins, being positioned forwardly of the inner extremity of said recesses.

3. A razor blade magazine holder adapted to have a blade magazine introduced into and removably retained therein comprising a top member, a bottom member and two side members, said top member and said bottom member having centrally positioned aligned recesses in their forward portions, at least one interiorly extended stop pin carried by said top member, said stop pin, or pins, being positioned forwardly of the inner extremity of said recesses and two side members forming opposed runways.

4. A razor blade magazine holder adapted to have a blade magazine introduced into and removably retained therein comprising a top member extending downardly, a bottom member and two side members, said top member and said bottom member having centrally positioned aligned recesses in their forward portions, at least one interiorly extended stop pin carried by said top member, said stop pin, or pins, being positioned forwardly of the inner extremity of said recesses and two side members forming opposed runways.

SIDNEY H. BENJAMIN.